US011586952B2

(12) United States Patent
Martinez et al.

(10) Patent No.: US 11,586,952 B2
(45) Date of Patent: Feb. 21, 2023

(54) ROBOTIC H MATRIX CREATION

(71) Applicant: Aerial Technologies Inc., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA); Pascal Paradis-Theberge, Montreal (CA)

(73) Assignee: Aerial Technologies Inc., Montreal (CA)

( * ) Notice: Subject to any disclaimer, the term of this patent is extended or adjusted under 35 U.S.C. 154(b) by 311 days.

(21) Appl. No.: 16/794,668

(22) Filed: Feb. 19, 2020

(65) Prior Publication Data
US 2020/0327430 A1    Oct. 15, 2020

Related U.S. Application Data

(60) Provisional application No. 62/809,356, filed on Feb. 22, 2019, provisional application No. 62/809,393, filed on Feb. 22, 2019.

(51) Int. Cl.
*G06N 5/04*       (2006.01)
*G01S 5/02*       (2010.01)
(Continued)

(52) U.S. Cl.
CPC .............. *G06N 5/04* (2013.01); *B25J 9/163* (2013.01); *G01S 5/0284* (2013.01); *G06N 20/00* (2019.01)

(58) Field of Classification Search
CPC . G06N 5/04; G06N 20/00; B25J 9/163; G01S 5/0284
See application file for complete search history.

(56) References Cited

U.S. PATENT DOCUMENTS 8,073,441 B1   12/2011  Unger et al.
8,461,988 B2   6/2013   Tran
(Continued)

FOREIGN PATENT DOCUMENTS

CA    3044480      5/2018
CN    105828289    8/2016
(Continued)

OTHER PUBLICATIONS

PCT Application No. PCT/IB2020/060271 International Search Report and Written Opinion dated Feb. 15, 2021.
(Continued)

*Primary Examiner* — Ernest G Tacsik
(74) *Attorney, Agent, or Firm* — Polsinelli LLP

(57) ABSTRACT

Systems and methods of using a robot to train the system for motion detection are provided. A simple robot can be put in a room and programmed not to move except in accordance with specific programmed command. Such commands may be sent to the robot regarding movement(s) at a certain rate than could be seen in the response to a channel. A data set may be built over time, where the robot may be programmed to move such that the robot does change at specific times in duration and amount. Such robot motion may also be iterated. The algorithm records the impulse response changes associated with the robot changes and a database may be built based on such recorded and associated changes.

17 Claims, 13 Drawing Sheets

(51) Int. Cl.
*B25J 9/16* (2006.01)
*G06N 20/00* (2019.01)

(56) References Cited

U.S. PATENT DOCUMENTS

| | | | |
|---|---|---|---|
| 9,219,790 | B1 | 12/2015 | Filev et al. |
| 9,414,115 | B1 | 8/2016 | Mao et al. |
| 9,703,892 | B2 | 7/2017 | Ramer et al. |
| 9,854,292 | B1 | 12/2017 | Matthews et al. |
| 9,867,548 | B2 | 1/2018 | Le et al. |
| 9,985,846 | B1 | 5/2018 | Roman et al. |
| 10,045,191 | B2 | 8/2018 | Nguyen et al. |
| 10,374,646 | B1 | 8/2019 | Fletcher |
| 10,419,880 | B1 | 9/2019 | Long et al. |
| 10,818,384 | B1* | 10/2020 | Peterson ............... G06F 16/951 |
| 10,999,705 | B2 | 5/2021 | Martinez |
| 11,017,688 | B1 | 5/2021 | Arazi |
| 11,039,278 | B1 | 6/2021 | Carreiro et al. |
| 11,082,109 | B2 | 8/2021 | Martinez |
| 11,218,769 | B2 | 1/2022 | Martinez |
| 11,448,726 | B2 | 9/2022 | Martinez |
| 11,523,253 | B2 | 12/2022 | Martinez |
| 2002/0188668 | A1 | 12/2002 | Jeffery et al. |
| 2006/0224938 | A1 | 10/2006 | Fikes et al. |
| 2007/0024580 | A1 | 2/2007 | Sands et al. |
| 2007/0266395 | A1 | 11/2007 | Lee et al. |
| 2008/0262909 | A1 | 10/2008 | Li et al. |
| 2010/0242063 | A1 | 9/2010 | Slaney et al. |
| 2011/0029277 | A1 | 2/2011 | Chowdhary et al. |
| 2011/0117924 | A1 | 5/2011 | Brunner et al. |
| 2011/0129047 | A1 | 6/2011 | Mashino et al. |
| 2011/0258039 | A1 | 10/2011 | Patwa et al. |
| 2012/0053472 | A1 | 3/2012 | Tran |
| 2012/0135733 | A1 | 5/2012 | Cormier et al. |
| 2012/0289147 | A1 | 11/2012 | Raleigh et al. |
| 2012/0324494 | A1 | 12/2012 | Burger et al. |
| 2013/0014136 | A1 | 1/2013 | Bhatia et al. |
| 2013/0028443 | A1 | 1/2013 | Pance et al. |
| 2013/0053990 | A1 | 2/2013 | Ackland |
| 2013/0102256 | A1 | 4/2013 | Cendrillon et al. |
| 2013/0115974 | A1 | 5/2013 | Lee et al. |
| 2013/0326554 | A1 | 12/2013 | Shkedi |
| 2014/0033240 | A1 | 1/2014 | Card et al. |
| 2014/0181100 | A1 | 6/2014 | Ramer et al. |
| 2014/0223467 | A1 | 8/2014 | Hayton et al. |
| 2014/0278389 | A1 | 9/2014 | Zurek et al. |
| 2014/0358012 | A1 | 12/2014 | Richards et al. |
| 2015/0026708 | A1 | 1/2015 | Ahmed et al. |
| 2015/0050923 | A1 | 2/2015 | Tu et al. |
| 2015/0092747 | A1 | 4/2015 | Ganesan |
| 2015/0110471 | A1 | 4/2015 | Zheng |
| 2015/0113556 | A1 | 4/2015 | Weast et al. |
| 2015/0121428 | A1 | 4/2015 | Nguyen et al. |
| 2015/0365787 | A1 | 12/2015 | Farrell |
| 2016/0057472 | A1 | 2/2016 | Gupta et al. |
| 2016/0105700 | A1 | 4/2016 | Collins et al. |
| 2016/0127766 | A1 | 5/2016 | Luk et al. |
| 2016/0174185 | A1 | 6/2016 | Ramakrishnan et al. |
| 2016/0253710 | A1 | 9/2016 | Publicover et al. |
| 2016/0277529 | A1 | 9/2016 | Chen et al. |
| 2016/0315682 | A1 | 10/2016 | Liu et al. |
| 2016/0337701 | A1 | 11/2016 | Khare et al. |
| 2016/0344779 | A1 | 11/2016 | Jain et al. |
| 2017/0032191 | A1 | 2/2017 | Ackland |
| 2017/0068790 | A1 | 3/2017 | Fuerst |
| 2017/0135635 | A1 | 5/2017 | Bostick et al. |
| 2017/0160089 | A1 | 6/2017 | Jang et al. |
| 2017/0315711 | A1 | 11/2017 | Adams |
| 2017/0332192 | A1 | 11/2017 | Edge |
| 2017/0354349 | A1 | 12/2017 | Mohapatra et al. |
| 2017/0366955 | A1 | 12/2017 | Edge |
| 2018/0008207 | A1 | 1/2018 | Sarkela et al. |
| 2018/0035072 | A1 | 2/2018 | Asarikuniyil et al. |
| 2018/0091952 | A1 | 3/2018 | Sant et al. |
| 2018/0181094 | A1 | 6/2018 | Funk et al. |
| 2018/0184165 | A1 | 6/2018 | Maughan et al. |
| 2018/0330406 | A1 | 11/2018 | Deluca et al. |
| 2019/0051342 | A1* | 2/2019 | Wootton ............. G11C 11/2255 |
| 2019/0174170 | A1 | 6/2019 | Chen |
| 2019/0178980 | A1 | 6/2019 | Zhang et al. |
| 2019/0188756 | A1 | 6/2019 | Bradley et al. |
| 2019/0246371 | A1 | 8/2019 | Hwang et al. |
| 2019/0306023 | A1 | 10/2019 | Vasseur et al. |
| 2020/0036592 | A1* | 1/2020 | Kholaif ................. H04L 67/306 |
| 2020/0090022 | A1* | 3/2020 | Ma ......................... G06N 3/008 |
| 2020/0112939 | A1 | 4/2020 | Scharf et al. |
| 2020/0120384 | A1 | 4/2020 | Armaly |
| 2020/0133383 | A1 | 4/2020 | Ahlstrom et al. |
| 2020/0186321 | A1 | 6/2020 | Hwang et al. |
| 2020/0226388 | A1 | 7/2020 | Ghessassi |
| 2020/0265700 | A1 | 8/2020 | Bergman et al. |
| 2020/0292572 | A1 | 9/2020 | Bateni |
| 2020/0296463 | A1 | 9/2020 | Martinez |
| 2020/0302478 | A1 | 9/2020 | Martinez |
| 2020/0303046 | A1 | 9/2020 | Martinez |
| 2020/0328793 | A1 | 10/2020 | Martinez |
| 2020/0329343 | A1 | 10/2020 | Martinez |
| 2020/0383119 | A1 | 12/2020 | Sun et al. |
| 2020/0397365 | A1 | 12/2020 | Zhang et al. |
| 2021/0063537 | A1 | 3/2021 | Martinez |
| 2021/0120370 | A1 | 4/2021 | Martinez |
| 2021/0352441 | A1 | 11/2021 | Liu |
| 2022/0060234 | A1 | 2/2022 | Martinez |
| 2022/0070633 | A1 | 3/2022 | Ghoshal |
| 2022/0167050 | A1 | 5/2022 | Martinez |
| 2022/0256429 | A1 | 8/2022 | Martinez |
| 2023/0003836 | | 1/2023 | Martinez |

FOREIGN PATENT DOCUMENTS

| | | |
|---|---|---|
| WO | WO 2016/187458 | 11/2016 |
| WO | WO 2018/094502 | 5/2018 |
| WO | WO 2020/170221 | 8/2020 |
| WO | WO 2020/240526 | 12/2020 |
| WO | WO 2021/084519 | 5/2021 |

OTHER PUBLICATIONS

U.S. Appl. No. 16/796,662 Office Action dated Feb. 12, 2021.
PCT Application No. PCT/IB2020/055186 International Preliminary Report on Patentability dated Nov. 16, 2021.
U.S. Appl. No. 16/795,198 Office Action dated Jan. 25, 2022.
U.S. Appl. No. 16/798,319 Office Action dated Dec. 29, 2021.
U.S. Appl. No. 17/006,579 Office Action dated Jan. 6, 2022.
PCT/IB2020/051503, Handling Concept Drift in Wi-Fi Based Localization, Feb. 22, 2020.
U.S. Appl. No. 16/796,662, Michel A. Martinez, Smart Media Display, Feb. 2020.
U.S. Appl. No. 16/795,198, Michel A. Martinez, Advertisement Engagement Measurement, Feb. 19, 2020.
U.S. Appl. No. 16/798,138, Michel A. Martinez, Small Motion Vector Identification in a Wi-Fi Motion Detection System, Feb. 2020.
U.S. Appl. No. 16/798,319, Michel A. Martinez, Wi-Fi Based Condition Monitoring, Feb. 2020.
U.S. Appl. No. 16/795,219, Michel A. Martinez, Self-Learning Based on Wi-Fi-Based Monitoring and Augmentation, Feb. 19, 2020.
U.S. Appl. No. 16/798,148, Seyedehsan Bateni, Wireless Motion Detection Using Multiband Filters, Feb. 21, 2020.
U.S. Appl. No. 17/006,579, Michel A. Martinez, System and Method for Presence and Pulse Detection From Wireless Systems, Aug. 28, 2020.
PCT Application No. PCT/IB2020/051503 International Search Report and Written Opinion dated Jul. 30, 2020.
U.S. Appl. No. 16/798,138 Office Action dated Sep. 8, 2020.
PCT Application No. PCT/IB2020/051503 International Preliminary Report on Patentability dated Aug. 10, 2021.
U.S. Appl. No. 16/798,148 Office Action dated Oct. 22, 2021.
U.S. Appl. No. 16/798,148 Final Office Action dated Apr. 8, 2022.

(56) References Cited

OTHER PUBLICATIONS

U.S. Appl. No. 17/131,078 Non-Final Office Action dated Mar. 2, 2022.
Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.eom/1424-8220/19/9/1984.
Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Aug. 2, 2017), [online] [retrieved on Aug. 20, 2020 (Aug. 20, 2020)], Retrieved from the internet: https://aaai.org/ocs/index.php/IAAI/IAAI17/paer/view/15010.
Rui Zhou et al., "Device-free Localization Based on CSI Fingerprints and Deep Neural Networks", 15 Annual IEEE International Conference on Sensing, Communication, and Networking (SECON), Jun. 11, 2018 (Nov. 6, 2018), [online] [retrieved on Aug. 20, 2020 (Aug. 20, 2020] Retrieved from the internet: https://dl.acm.org/doi/10.1145/2639108.2639143.
Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.
Yang Wang et al., "E-eyes: Device-free Location-oriented Activity Identification Using Fine-grained Wifi Signatures", MobiCom'14, pp. 617-628 Sep. 7, 2014 (Sep. 7, 2014), [retrieved on Aug. 20, 2020 (Aug. 20, 2020)], Retrieved from the internet: https://dl.acm.org/doi/10.1145/2639108.2639143.
PCT Application No. PCT/IB2020/055186 International Search Report and Written Opinion dated Oct. 15, 2020.
PCT Application No. PCT/IB2020/060271 International Preliminary Report on Patentability dated May 3, 2022.
U.S. Appl. No. 16/798,319 Final Office Action dated Jun. 13, 2022.
U.S. Appl. No. 16/798,148 Office Action dated Jul. 26, 2022.
Xi et al.; "Electronic Frog Eye: Counting Crowd Using WiFi", Department of Computer Science, Jul. 8, 2014.
Xu et al., "SCPL: Indoor Device-Free Multi-Subject Counting and Localization Using Radio Signal Strength", 2013.
U.S. Appl. No. 17/539,872 Office Action dated Jan. 5, 2023.
U.S. Appl. No. 16/798,148 Final Office Action dated Jan. 3, 2023.
U.S. Appl. No. 17/902,070, Michel A. Martinez, System and Method for Presence and Pulse Detection From Wireless Signals, filed Sep. 2, 2022.

* cited by examiner

| 200 Profile Program Number | 202 Profile Action Name | 204 Profile Signal Data | Speed Sensitivity Profile Data | Location Sensitivity Profile Data |
|---|---|---|---|---|
| 1 | Wave Hand | CSI_Data.WaveHand | CSI_Data.WaveHand_Speed | CSI_Data.WaveHand_Location |
| 2 | Walk | CSI_Data.Walk | CSI_Data.Walk_Speed | CSI_Data.Walk_Location |
| 3 | Jump | CSI_Data.Jump | CSI_Data.Jump_Speed | CSI_Data.Jump_Location |
| 4 | Sit in chair | CSI_Data.SitInChair | CSI_Data.SitInChair_Speed | CSI_Data.SitInChair_Location |
| 5 | Sit on floor | CSI_Data.SitOnFloor | CSI_Data.SitOnFloor_Speed | CSI_Data.SitOnFloor_Location |
| 6 | Lay down on bed | CSI_Data.LayDownOnBed | CSI_Data.LayDownOnBed_Speed | CSI_Data.LayDownOnBed_Location |
| 7 | Fall down | CSI_Data.FallDown | CSI_Data.FallDown_Speed | CSI_Data.FallDown_Location |
|  |  |  | CSI_Data.KickOutLeg_Speed | CSI_Data.KickOutLeg_Location |

FIG. 2

| Training Program Number | Training Action Name | Training Program or Execution Code | Normal Training Data | Speed Sensitivity Training Data | Location Sensitivity Training Data | Normal Variation Data | Speed Variation Data | Location Variation Data |
|---|---|---|---|---|---|---|---|---|
| 1 | Wave Hand | execute program wavehand.exe | CSI Data.WaveHand | CSI Data.WaveHand_Speed | CSI Data.WaveHand_Location | CSI Data.WaveHand_VARNormal | CSI Data.WaveHand_VARSpeed | CSI Data.WaveHand_VARLocation |
| 2 | Walk | execute program walk.exe | CSI Data.Walk | CSI Data.Walk_Speed | CSI Data.Walk_Location | CSI Data.Walk_VARNormal | CSI Data.Walk_VARSpeed | CSI Data.Walk_VARLocation |
| 3 | Jump | execute program jump.exe | CSI Data.Jump | CSI Data.Jump_Speed | CSI Data.Jump_Location | CSI Data.Jump_VARNormal | CSI Data.Jump_VARSpeed | CSI Data.Jump_VARLocation |
| 4 | Sit in chair | execute program sitinchair.exe | CSI Data.SitInChair | CSI Data.SitInChair_Speed | CSI Data.SitInChair_Location | CSI Data.SitInChair_VARNormal | CSI Data.SitInChair_VARSpeed | CSI Data.SitInChair_VARLocation |
| 5 | Sit on floor | execute program sitonfloor.exe | CSI Data.SitOnFloor | CSI Data.SitOnFloor_Speed | CSI Data.SitOnFloor_Location | CSI Data.SitOnFloor_VARNormal | CSI Data.SitOnFloor_VARSpeed | CSI Data.SitOnFloor_VARLocation |
| 6 | Lay down on bed | execute program laydownonbed.exe | CSI Data.LayDownOnBed | CSI Data.LayDownOnBed_Speed | CSI Data.LayDownOnBed_Location | CSI Data.LayDownOnBed_VARNormal | CSI Data.LayDownOnBed_VARSpeed | CSI Data.LayDownOnBed_VARLocation |
| 7 | Fall down | execute program falldown.exe | CSI Data.FallDown | CSI Data.FallDown_Speed | CSI Data.FallDown_Location | CSI Data.FallDown_VARNormal | CSI Data.FallDown_VARSpeed | CSI Data.FallDown_VARLocation |
| 8 | Kick out Leg | execute program kickoutleg.exe | CSI Data.KickOutLeg | CSI Data.KickOutLeg_Speed | CSI Data.KickOutLeg_Location | CSI Data.KickOutLeg_VARNormal | CSI Data.KickOutLeg_VARSpeed | CSI Data.KickOutLeg_VARLocation |

FIG. 3

| Device | Location | Function | Activity |
|---|---|---|---|
| Switch 1 | Bathroom | Lights | Turn Switch |
| Switch 2 | Living Room | Lights | Turn Switch |
| Switch 3 | Kitchen | Lights | Turn Switch |
| Thermostat | Living Room | Temperature | Adjust Dial |
| ... | | | |
| Refrigerator | Kitchen | Food Storage | Open Door |

FIG. 10

ROBOTIC H MATRIX CREATION

CROSS-REFERENCE TO RELATED APPLICATIONS

The present application claims the priority benefit of U.S. Provisional Patent Application No. 62/809,356 filed on Feb. 22, 2019 and entitled "Robotic Age Matrix Creation" and of U.S. Provisional Patent Application No. 62/809,393 filed on Feb. 22, 2019, entitled "Meta Tag for Waveform Artifacts," the disclosures of which are incorporated herein by reference in their entirety.

BACKGROUND OF THE INVENTION

1. Field of the Invention

The present disclosure is generally related to using a robot and machine learning to train a motion detection system. Specifically, using a robot to perform human motions repeatedly to teach a Wi-Fi motion detection system to identify different human activities with in a target environment.

2. Description of the Related Art

Motion detection is the process of detecting a change in the position of an object relative to associated surroundings or a change in the surroundings relative to an object. Motion detection is usually a software-based monitoring algorithm which. For example when motions are detected, the surveillance camera may be signaled to begin capturing the event. An advanced motion detection surveillance system can analyze the type of motion to see if an alarm is warranted.

Wi-Fi location determination, also known as Wi-Fi localization or Wi-Fi location estimation refers to methods of translating observed Wi-Fi signal strengths into locations. A "radio map", consisting of sets of metadata containing information about the frequency response of the channel, and/or phase response of the channel, and/or impulse response of the channel, and/or Received Signal Strength Indicators (RSSI), and/or any other statistic that describes the wireless communication link between paired devices is stored as a profile to be compared later to a signal scan to recognize the location of the device doing the scanning.

There is therefore a need in the art for improved systems and methods of robotic matric creation.

SUMMARY OF THE CLAIMED INVENTION

Embodiments of the present invention provides for training a motion detection system in which a robot can replicate movements repeatedly in the exact same manner to provide a better model for frequency data for motion detection. A system for training a motion detection system is disclosed that includes a training robot, a training module, a correction module, a variation module, a training database, a profile database, an execution module, a speed sensitivity module, and a location sensitivity module. The training module sends pre-programmed movements to the training robot to perform and monitors and stores the received signal generated in the impulse response data by the training robot. The new training data is updated in the profile database.

Methods are provided for utilizing the context data from the internet of things (IoT) devices to augment the data provided by the agent, so that a larger library of profiles can be matched to known activities and locations of those activities. The system provided improves a Wi-Fi motion detection system by using IoT device data. The system includes a Wi-Fi motion detection system, an IoT device database, a cloud server, and an IoT device. The system collects location and activity data and associates such data with data from the IoT devices.

BRIEF DESCRIPTIONS OF THE DRAWINGS

FIG. 2 illustrates an exemplary profile database.

FIG. 3 illustrates an exemplary training database.

FIG. 10 illustrates an exemplary IoT device database.

DETAILED DESCRIPTION

Systems and methods of using a robot to train the system for motion detection are provided. A simple robot can be put in a room and programmed not to move except in accordance with specific programmed command. Such commands may be sent to the robot regarding movement(s) at a certain rate than could be seen in the response to a channel. A data set may be built over time, where the robot may be programmed to move such that the robot does change at specific times in duration and amount. Such robot motion may also be iterated. The algorithm records the impulse response changes associated with the robot changes and a database may be built based on such recorded and associated changes.

Figure 1:
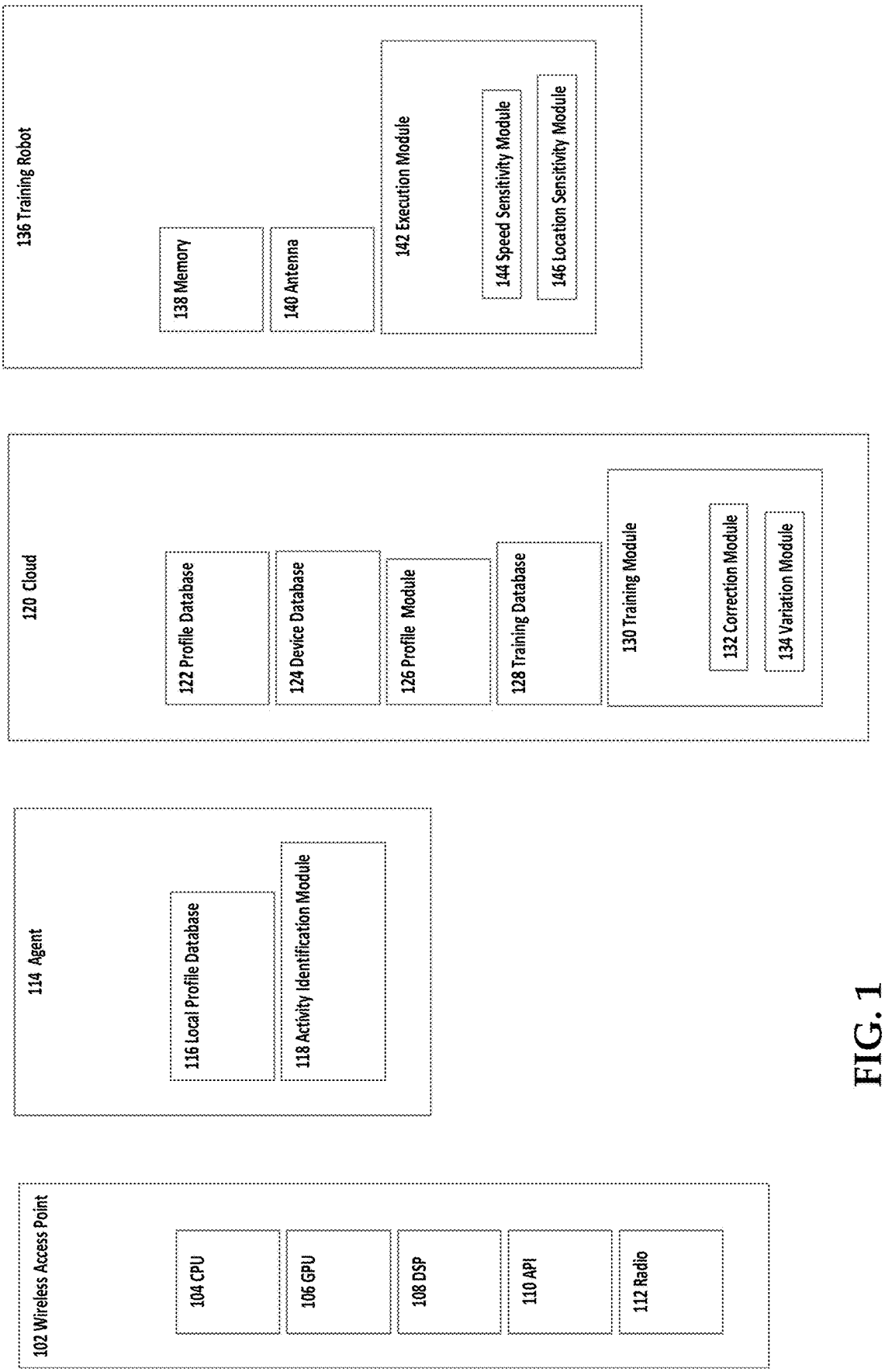
FIG. 1 illustrates an exemplary network environment in which a system for robotic training regarding Wi-Fi motion detection may be implemented.

FIG. 1 illustrates an exemplary network environment in which a system for robotic training regarding Wi-Fi motion detection may be implemented. Such network environment may include a wireless access point 102, which may be a Wi-Fi access point. In an embodiment, the wireless access point 102 is an 802.11n access point. The wireless transceiver of the wireless access point 102 is in communication with the further stationary device over a corresponding further one of the at least one radio frequency communication link. The wireless access point 102 is configured to record a further channel state information data set for the further one of the at least one radio frequency communication link at a corresponding time. In an embodiment, determining the activity of the person in the environment includes determining the activity of the person in the environment based on a comparison of the further channel state information data set to each of the at least one channel state information profile of each of the plurality of activity profiles. In an embodiment, the activity is determined based on a sum of a similarity measurement of the channel state information data set and a similarity measurement of the further channel state information data set.

A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. Modern GPUs 106 are very efficient at manipulating computer graphics and image processing. The highly parallel structure makes such processors more efficient than general-purpose CPUs 104 for algorithms that process large blocks of data in parallel.

A digital signal processor (DSP) 108 is a specialized microprocessor (or a SIP block), with associated architecture optimized for the operational needs of digital signal processing. The DSP 108 may measure, filter or compress continuous real-world analog signals.

An application program interface (API) 110 is a set of routines, protocols, and tools for building software applications. Basically, an API 110 specifies how software components could interact. Additionally, APIs 110 are used when programming graphical user interface (GUI) components. The API 110 may provide access to the channel state data to the agent 114. A wireless access point 102 compliant with either 802.11b or 802.11g, using an omnidirectional antenna might have a range of 100 m (0.062 mi). The same radio 112 with an external semi parabolic antenna (15 dB gain) with a similarly equipped receiver at the far end might have a range over 20 miles.

An agent 114 may be a separate device or integrated module executable to collect data from the Wi-Fi chipset of wireless access point 102, filter the incoming data then feed, and pass such data to the cloud server 120 for activity identification. Depending on the configuration, the activity identification can be done on the edge, at the level of the agent 114, or in the cloud server 120, or some combination of the two.

A local profile database 116 is utilized when at least a portion of the activity identification is done on the edge. The activity identification could be a simple motion/no-motion determination profile, or a plurality of profiles for identifying activities, objects, individuals, biometrics, etc.

An activity identification module 118 distinguishes between walking activities and in-place activities. In general, a walking activity causes significant pattern changes of the impulse response amplitude over time, since walking generally involves significant body movements and location changes. In contrast, an in-place activity (such as watching TV from a sofa) only involves relative smaller body movements and may not cause significant amplitude changes, instead presenting certain repetitive patterns within the impulse response measurements.

A cloud server 120 may analyze and create profiles describing various activities. As illustrated, the cloud server 120 may include a profiled database 122, device database 124, profile module 126, training database 128, and training module 130 (which may further include correction module 132 and variation module 134).

The profile module 126 monitors the data set resulting from continuously monitoring a target environment so as to identify multiple similar instances of an activity without a matching profile in such a data set, to combine that data with user feedback, to label the resulting clusters, and to define new profiles that are then added to the profile database 122.

A profile database 122 may be utilized when at least a portion of the activity identification is done in the cloud server 120 or when a profile is sent to cloud server 120 for storage. The activity identification could be a simple motion/no-motion determination profile, or a plurality of profiles for identifying activities, objects, individuals, biometrics, etc. A device database 124 may store the device ID of all connected wireless access points 102. In some embodiments, one or more of the devices may be IoT devices (e.g., IoT device database of FIG. 10).

A profile module 126 monitors the data set resulting from continuous monitoring of a target environment to identify multiple similar instances of an activity without a matching profile in such a data set, to combine such data with user feedback, to label the resulting clusters, and to define new profiles that are then added to the profile database 122.

A training database 128 may store programming for a training robot 136, and the stored programming may include executable commands each representing different human actions. These stored programs or executable commands are sent to a training robot 136 to make the training robot 136 perform certain actions. For example, the training database 128 may store programming or executable commands for a training robot 136 to "walk slowly" or "jump in one place". The training database 128 could store the actual code or programming required to control the movements of the training robot 136, thereby limiting the need for program or code to be stored on the training robot 136. Alternatively, the training database 128 may store just a command to execute a program stored on the memory of the training robot 136. Furthermore, the training database 128 also stores the signal data that is monitored during the test, including the speed sensitivity data and location sensitivity data.

A training module 130 may select an action from the training database 128 and send the selected programming to the training robot 136. The training robot 136 may then perform the programmed response. The training module 130 then monitors the signal of the target environment of the training robot 136. The monitored signal data is then compared to profile database 122 to see if there is a similar monitored signal data stored in the profile database 122 and determines if the action by the training robot 136 matches the action associated with data in the profile database 122 based on the comparison. If the monitored data and action do not match, the correction module 132 is initiated and the new data and action are added to the profile database 122. For example, the training module 130 selects the first program from the training database 128, which makes the training robot 136 "walk" at a predetermined standard pace. As the training robot 136 is performing the programmed motions the signal data is monitored and then compared to the profile database 122 to see if there is a matching "walking" action. If there is no "walking" action in the profile database 122, a "walking" action may be added. If there is a match, the new data is added to the profile database 122 to update the "walking" profile with the new signal data.

A correction module 132 is initiated when there is no matching action that was performed by the training robot 136 in the profile database 122 but there is matching signal data. For example, a training robot 136 performs a predefined walking function, and that signal data is captured, but there is no matching "walking" action in the profile database 122 while the new signal data matches the action "jumping" in the profile database 122. To prevent duplicate signals, the "walking" action and associated signal data are added to the profile database 122; and the correction module 132 performs, captures, and update the signal data for a "jumping" action.

A variation module 134 is executed by the training module 130 and re-runs the exact same training program. The variation module 134 evaluates the difference between the first training run by the training module 130 and the second identical training run by the variation module 134 to identify and train the system on any possible variations in the frequency response data.

A training robot 136 is designed to mimic the human body and human movements. The training robot 136 receives a programmed commands from the training module 130. The program tells the training robot 136 to make a series of movements to mimics human motions. Unlike a human, the training robot 136 can perform a task repeatedly the exact same way to get a better data set. Alternatively, the training robot 136 could be programmed to make slight alterations to robotic movement to create a more human type movement. A memory 138 stores software and program code that controls the training robot 136. The memory 138 may store all of the programming required for controlling the training robot 136 or can store programming sent from a remote user or the training module 130. An antenna 140 for receiving commands and data from a remote user or directly from the training module 130.

An execution module 142 receives the program from the training module 130 or correction module 132, as well as executes the receive program. The execution module 142 is stored on the memory 138 of the training robot 136. The execution module 142 further sends a signal to the training module 130 or correction module 132 upon completion of program execution. A speed sensitivity module 144 is called by the execution module 142 to vary the speed of the training robot 136 (e.g., moving from slow to fast) to determine when the monitored Wi-Fi signal changes from a predefined speed of movement. As such, the system can test and eliminate speed sensitivity.

Furthermore, the speed sensitivity module 144 can be stored and executed, either from the training robot 136 or from the cloud server 120. A location sensitivity module 146 may be called by the execution module 142, and the location of the training robot 136 may be varied as the programmed movement is performed. Specifically, the speed sensitivity module 144 could move the training robot 136 away from and towards the wireless access point 102. Such movement may allow for determination of when the monitored signal changes. As such, the system can test and eliminate location sensitivity. Furthermore, the location sensitivity module 146 can be stored and executed, either from the training robot 136 or from the cloud server 120.

FIG. 2 illustrates an exemplary profile database (e.g., profile database 122). One skilled in the art may appreciate that for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The profile database 122 is utilized when at least a portion of the activity identification is done in the cloud server 120. This could be a simple motion/no-motion determination profile, or a plurality of profiles for identifying activities, objects, individuals, biometrics, etc. For example, the profile database 122 may store a profile program number 200 and a profile action name 202 that describes the activity or action of that is represented by the frequency response data. Additionally, the profile database 122 may store the frequency response data that is associated with the action as the profile signal data 204. Profile database 122 may further store speed sensitivity profile data and location sensitivity profile data.

FIG. 3 illustrates an exemplary training database (e.g., training database 128). The training database 128 is utilized to store programming for a training robot 136 and the monitored frequency response data. The training database 128 stores software code or an execution command that represents different actions that can be sent the training robot 136. These actions represent human movements. The training database 128 further stores the name of the action or movement performed (e.g., wave hand, Jump, kick leg out, etc.), the execution command or program code, and the frequency response data for three different tests, normal test, speed sensitivity test, and locations test. As illustrated, training database 128 may store data regarding training program number, training action name, training program or execution code, normal training data, speed sensitivity training data, location sensitivity training data, normal variation data, speed variation data, and location variation data.

Figure 4:
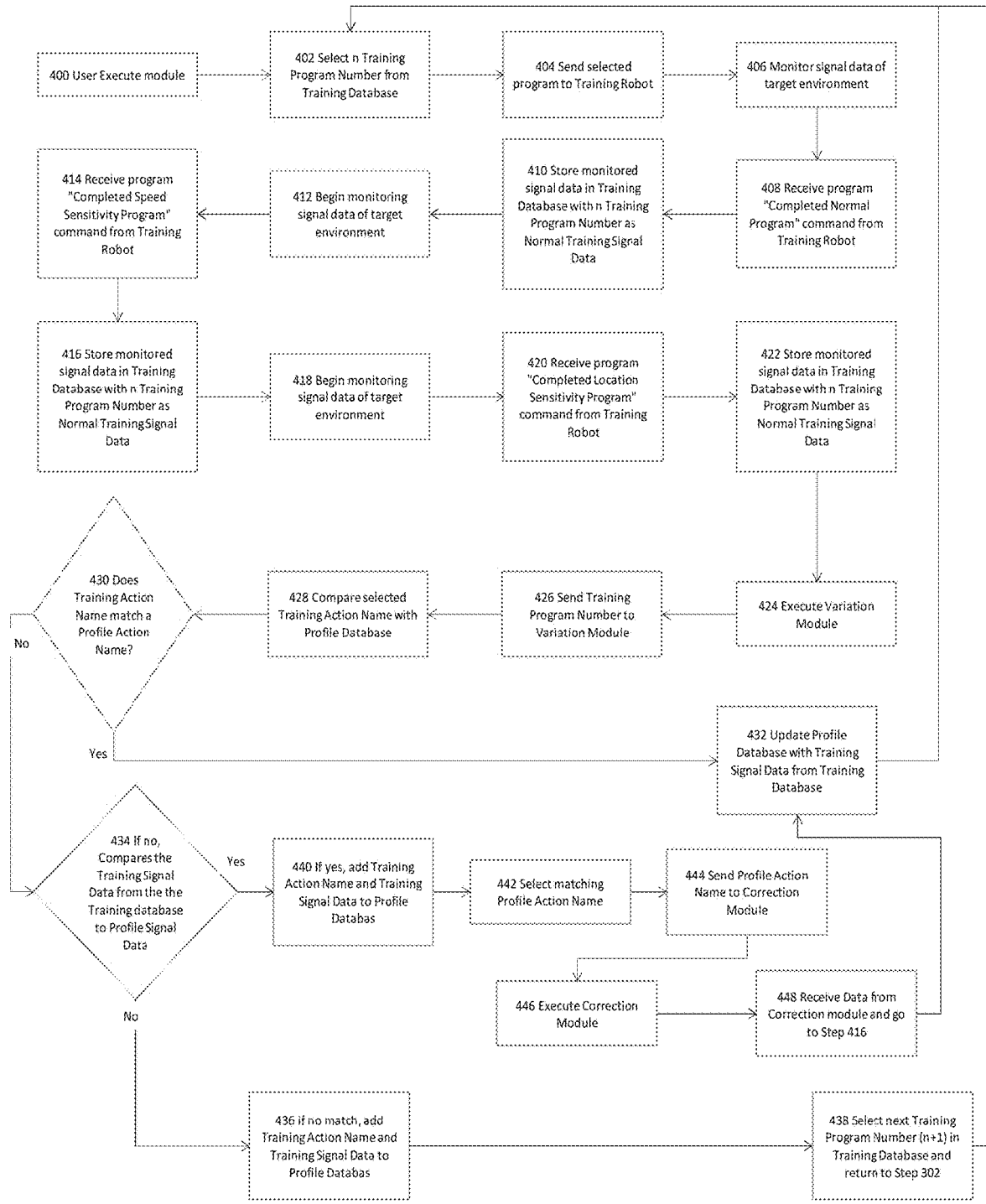
FIG. 4 is a flowchart illustrating an exemplary method of robotic training.

FIG. 4 is a flowchart illustrating an exemplary method of robotic training. The process begins with initiation of the training module 130 (e.g., based on user input received via a user interface of a user device) in step 400. The user interface could be associated with a remote terminal or a mobile device. Once the training module 130 is initiated, a training program is selected from the training database 128. If this is the first time or part of the initial run of the program, "n" may equal 1 (n=1) where n represents the training program number in the training database 128.

The training program in the training database 128 is selected at step 402. The selected training program is sent to the execution module 142 on the training robot 136. For example, if this the first time the program is running and the first program in the training database 128 is selected, such selection may be "wavehand.exe" at step 404. The training module 130 then begins monitoring the frequency response signal data at the target environment where the training robot 136 is located.

The frequency response data is only monitored while the training robot 136 performs the training program at step 406. While monitoring frequency response data, the training module 130 waits for a command from the training robot 136 that a "normal" program has been completed. The command tells the training module 130 to stop monitoring the frequency responses data. For example, the training program for mimicking waving a hand (e.g., "wave hand") is sent to the training robot 136. The training module 130 could then immediately begin to monitor the frequency response data until the "completed normal program" command is received.

The monitored data could now represent the motion of waving a hand at step 408. The training module 130 then stores the monitored frequency response data in to the training database 128 with the program that was originally selected in step 410. For example, the frequency response data that was monitored from the time the training program was executed to receiving the "completed normal program" command from the training robot 136 may be stored in the training database 128 with the "wave hand" training program. The "wave hand" training program could now have frequency response data stored in the training database 128 under the normal training signal data at step 410. The training module 130 then begins monitoring the frequency response signal data again at the target environment where the training robot 136 is located. The frequency response data may only be monitored while the training robot 136 performs the training program that was sent.

One aspect of monitoring the signal data again is associated with the training robot 136 performing the program but at different speeds at step 412. While monitoring frequency response data, the training module 130 waits for a command from the training robot 136 that a "speed sensitivity" program has been completed.

The command tells the training module 130 to stop monitoring the frequency responses data at step 414. The training module 130 then stores the monitored frequency response data in to the training database 128 with the program that was originally selected. For example, the frequency response data that was monitored between the time the training program was executed and the time that the "completed speed sensitivity program" command was received from the training robot 136 is stored in the training database 128 with the "wave hand" training program.

The "wave hand" training program could now have frequency response data stored in the training database 128 under the speed sensitivity training data at step 416. The training module 130 may then begin monitoring the frequency response signal data again at the target environment where the training robot 136 is located. The frequency response data is only monitored while the training robot 136 performs the training program that was sent.

One aspect of monitoring the signal data includes the training robot 136 performing the program but at different distances from the access point 102 at step 418. While monitoring frequency response data, the training module 130 waits for a command from the training robot 136 that a "location sensitivity" program has been completed. The command tells the training module 130 to stop monitoring the frequency responses data at step 420. The training module 130 then stores the monitored frequency response data in to the training database 128 with the program that was originally selected. For example, the frequency response data that was monitored between the time the training program was executed and the time the "completed location sensitivity program" command was received from the training robot 136 is stored in the training database 128 with the "wave hand" training program.

The "wave hand" training program could now have frequency response data stored in the training database 128 under the location sensitivity training data at step 422. The variation module 134 is then executed. The variations module 134 is executed at the end of the training module 130 and before the training module 130 moves on to the next training program. The variation module 134 re-runs the same test program as the training module 130, monitors the data during the identical test and then compares the frequency response data from training module 130 to the frequency response data collected while running the variation module 134.

The training module 130 then updates variations in the two data sets and updates the training database 128 at step 424. The number of the training program "n" is sent to the variation database regarding which training program to run at step 426. The training module 130 then compares the training action name from the training database 128 with the profile action names 202 in the profile database 122. The action names are compared to see if there is already a similar action in the profile database 122. For example, the training module 130 could compare the action name "wave hand", which was the training program that was executed, to see if there was a matching action in the profile database 122 at step 428.

The training module 130 then checks to see if the selected training action name matches any profile action names (e.g., "wave hand") at step 430. If the training action name and profile action name 202 match, the training module 130 updates the profile signal data 204 with the training signal data in the profile database 122. For example, if there is already a "wave hand" action in the profile database 122 the new signal data collected during the training program is added to the "wave hand" profile in the profile database 122 at step 432. If there is no match of the training action name and the profile action names, the training module 130 then compares the stored training signal data with the profile signal data 204 to see if there is similar signal data with a different action name in the profile database 122. One consideration is to make sure that there are not any duplicates of the signal data in the profile database 122 for the same action even if the action names do not match.

For example, if there is no "wave hand" in the profile database 122 then signal data that was monitored during the training program is compared to all of the signal data in the profile database 122 at step 434. If the training signal data does not have any match with any of the profile signal data 204 and the action names do not match, a new action name is added to the profile database 122 using the data from the training database 128 at step 436. Once the profile database 122 is updated or new data added, the training module 130 selects the next program in the training database 128 (n+1) is selected until there are no more programs to run from the training database 128 at step 438. If there is no match of the profile action names 202 but there is a signal match as described at step 418, the system adds the data from the training database 128 to the profile database 122 to create a new action (e.g., wave hand) at step 440.

The training module 130 then selects the profile action name 202 where the training signal data matched the profile signal data 204 at step 442. The profile action name 202 that was selected is then sent to the correction module 132 and the corrections module is executed at step 444. The correction module 132 runs and correct signal data in the profile database 122 that matched a training signal data. For example, if the "wave hand" training signal data matches a profile signal data 204 for "kick out leg" then the correction module 132 could find the corresponding training program in the training database 128, run the training program for "kick out leg" with the training robot 136, monitor the new signal and update the "kick out leg" with the new signal data. One aspect is to eliminate any duplicate signal data at step 446. Once the correction module 132 completes a task, the correction module 132 sends the corrected signal and action data back, and such data is updated in the profile database 122 at step 448.

Figure 5:
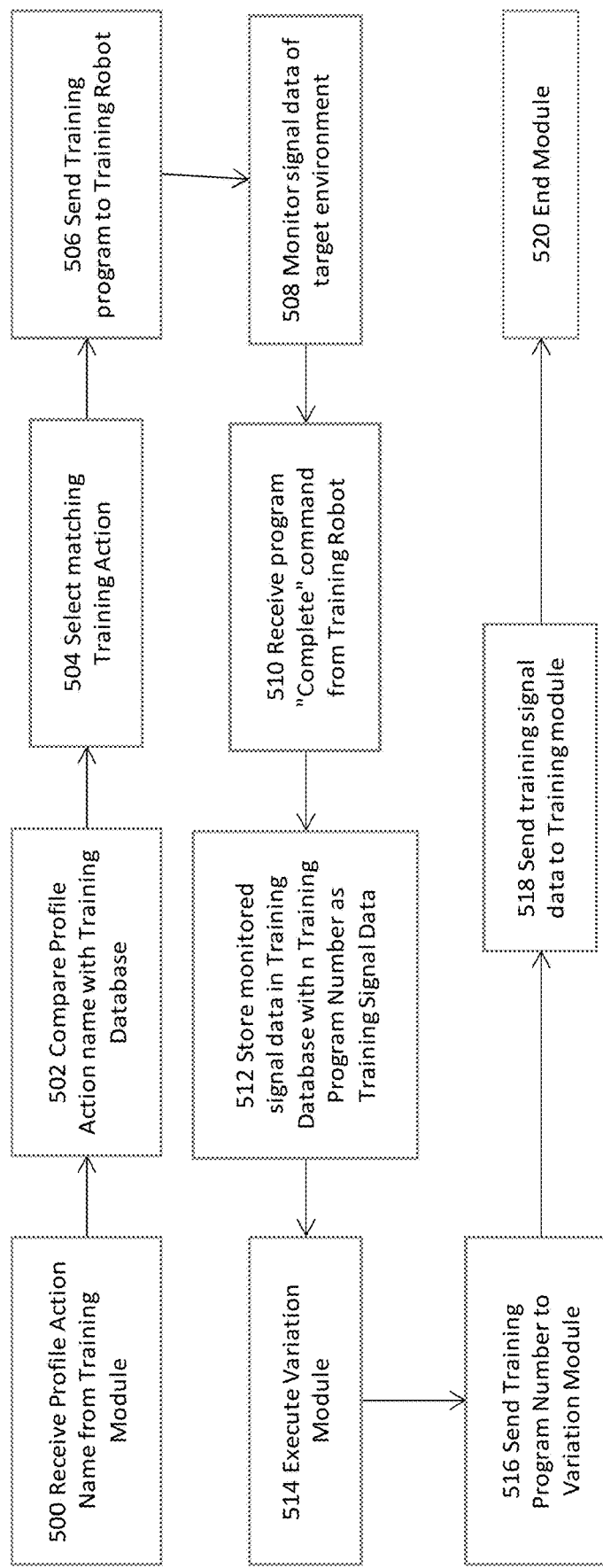
FIG. 5 is a flowchart illustrating an exemplary of training correction.

FIG. 5 is a flowchart illustrating an exemplary of training correction. The process begins with the correction module 132 receiving from the training module 130 the profile action name 202 from the profile database 122 where the training and profile signals matched at step 500. The correction module 132 compares the received profile action name 202 with the training database 128 to find the matching training action name. For example, if the training data for "Wave hand" matches the profile data for "kick out leg" the correction module 132 could look for the same training action name ("kick out leg") in the training database 128 at step 502. The training program is selected from the training database 128 (e.g., "Kick leg out") at step 504.

The selected training program is sent to the execution module 142 on the training robot 136. For example, the program could send the "kickoutleg.exe" training program for execution at step 506. The frequency response data from the Wi-Fi signal from the environment which the training robot 136 is placed is monitored while the training robot 136 executes the program at step 508. The correction module 132 stops monitoring the frequency response data once a message is received from the training robot 136 that the program is complete at step 510. The correction module 132 then stores the monitored signal data in to the training database 128 with the program that was originally selected. In this example, the signal data is stored with the "kick out leg" program at step 512. The variation module 134 is then executed at the end of the training module 130 and before the training module 130 moves on to the next training program. The variation module 134 re-runs the same test program as the training module 130, monitors the data during the identical test, and then compares the frequency response data from training module 130 to the frequency response data collected while running the variation module 134.

The correction module 132 then updates variations in the two data sets and updates the training database 128 at step 514. The number of the training program "n" is sent to the variation database regarding which training program to run at step 516. The stored training data is then sent to back to the training module 130 to be used to update the profile database 122 at step 518. The correction module 132 ends and returns to the training module 130 at step 520.

Figure 6:
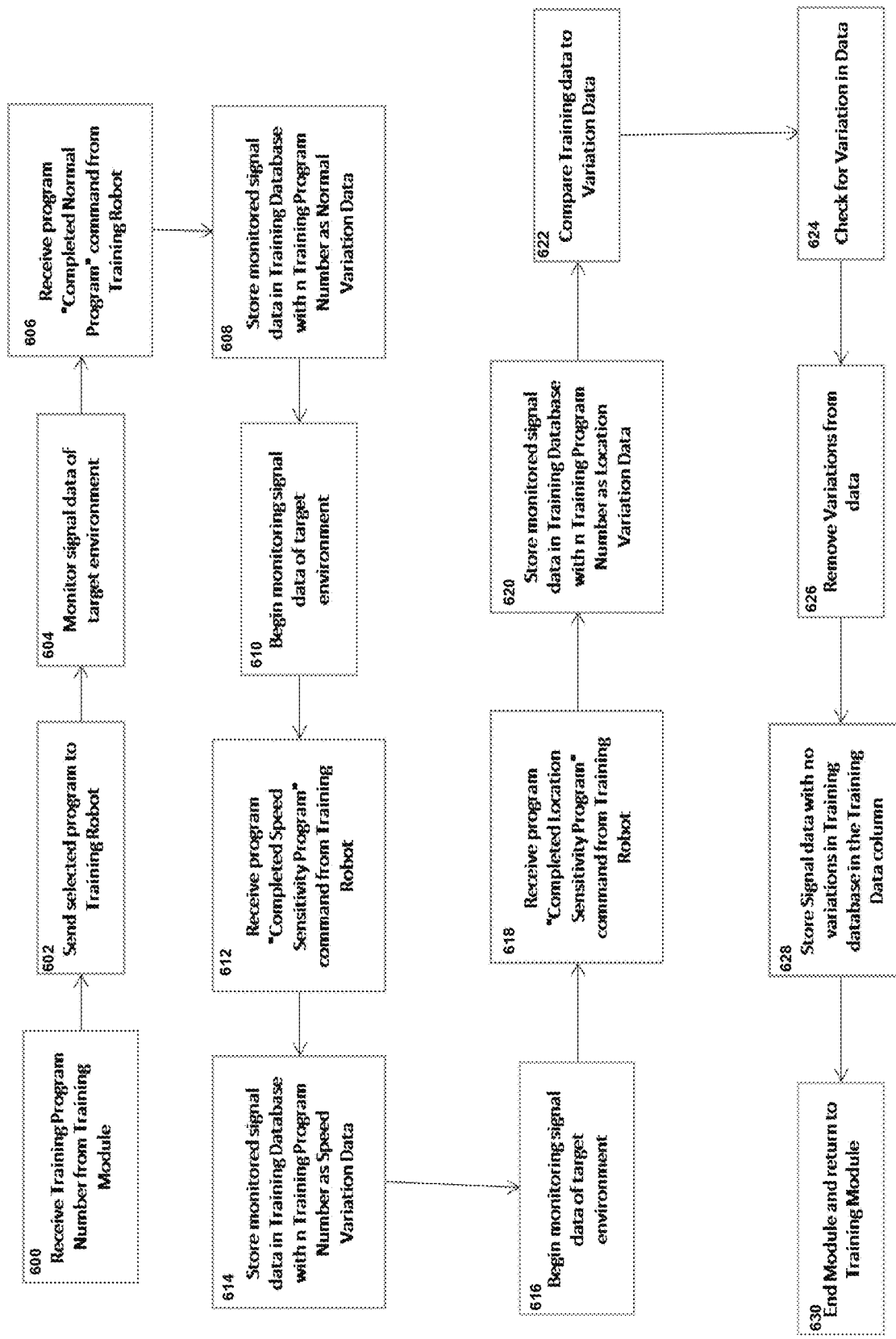
FIG. 6 is a flowchart illustrating an exemplary of detecting training variation.

FIG. 6 is a flowchart illustrating an exemplary of detecting training variation. In step 600, the process begins with execution of the variation module 134 to receive from the training module 130 the training program that is has just run. The variation module 134 then sends that training program to the training robot 136 at step 602. The variation module 134 begins to monitor the impulse response of the channel, while the training robot 136 is performing the training program at step 604. The variation module 134 stops monitoring the signal when the command is received indicating that the training robot 136 has completed the normal run of the training program at step 606.

The monitored data is then stored in the training database 128 as normal variation data at step 608. The variation module 134 then begins monitoring the impulse response of the channel again as the training robot 136 performs the training program at different speeds at step 610. The variation module 134 stops monitoring the signal when the command is received indicating that the training robot 136 has completed the speed sensitivity test of the training program at step 612. The monitored data is then stored in the training database 128 as speed variation data at step 614. The variation module 134 then begins monitoring the impulse response of the channel again as the training robot 136 performs the training program at different distances from the wireless access point 102 at step 616.

The variation module 134 stops monitoring the signal when the command is received indicating that the training robot 136 has completed the location sensitivity test of the training program at step 618. The monitored data is then stored in the training database 128 as location variation data at step 620. The stored training data is then compared to the variation data of the same training program. In step 622, the normal training data is compared to the normal variation data, as well as the speed and location sensitivity data. As the data is compared, the variation module 132 checks for major variations in the data.

Small changes in amplitude on the same slope may be ignored, but fundamental changes in the shape of the H matrix could be considered an anomaly and removed from the signal data at step 624. Any variations or anomalies found in the data may be removed at step 626. The "variation free" data is then stored back in the training database 128 in the respective training columns at step 628. Once the data is stored in the training database 128, the correction module 132 ends execution and returns to the training module 130 at step 630.

Figure 7:
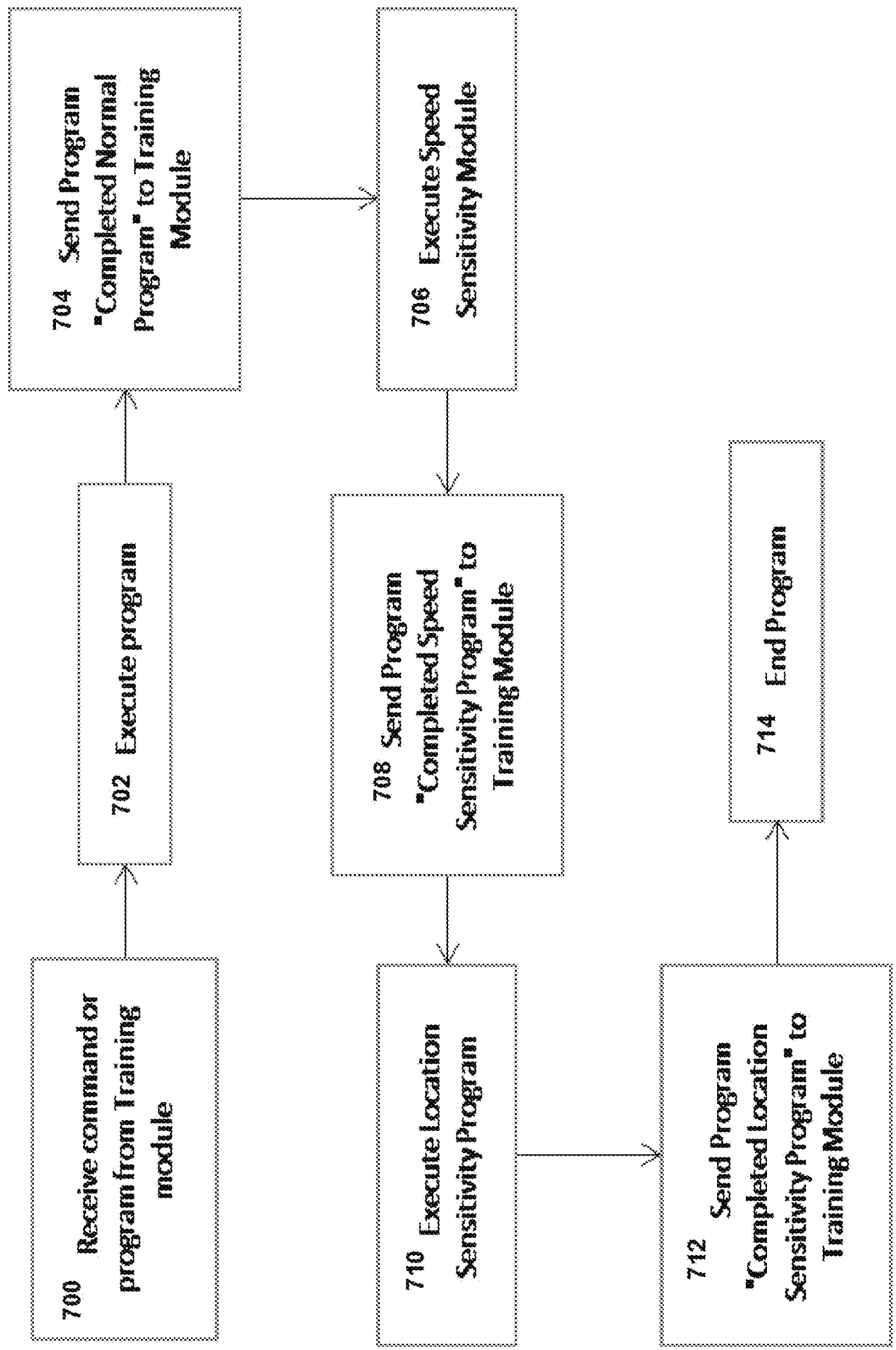
FIG. 7 is an illustration of an exemplary method of execution module, according to various embodiments.

FIG. 7 is an illustration of an exemplary method of execution module 142, according to various embodiments. In step 700, the process begins with execution of the training robot 136 to receive from the training module 130 a program or command. The training robot 136 then executes the program or command from memory 138. In some cases, the instructions for controlling the training robot 136 may be sent to the training robot 136. Some embodiments allow for the code that controls the training robot 136 to be stored in memory 138 and executed at step 702. Once the training robot 136 had completed, the program, a signal is sent back to the training module 130 regarding a completion of the program at step 704.

The execution module 142 then executes the speed sensitivity module 144, which runs the training program at different speeds, first running the program at double or triple the defined normal speed and then at either two or three times slower than normal at step 706. Once the training robot 136 had completed the program normally, a signal is sent back to the training module 130 regarding a normal completion of the program at step 708. The execution module 142 then executes the location sensitivity module 146, which runs the training program at different at different distances from the wireless access point 102 at step 710. Once the training robot 136 had completed, the program, signal may be sent back to the training module 130 regarding completion of the program at step 712. The program may end at step 714.

Figure 8:
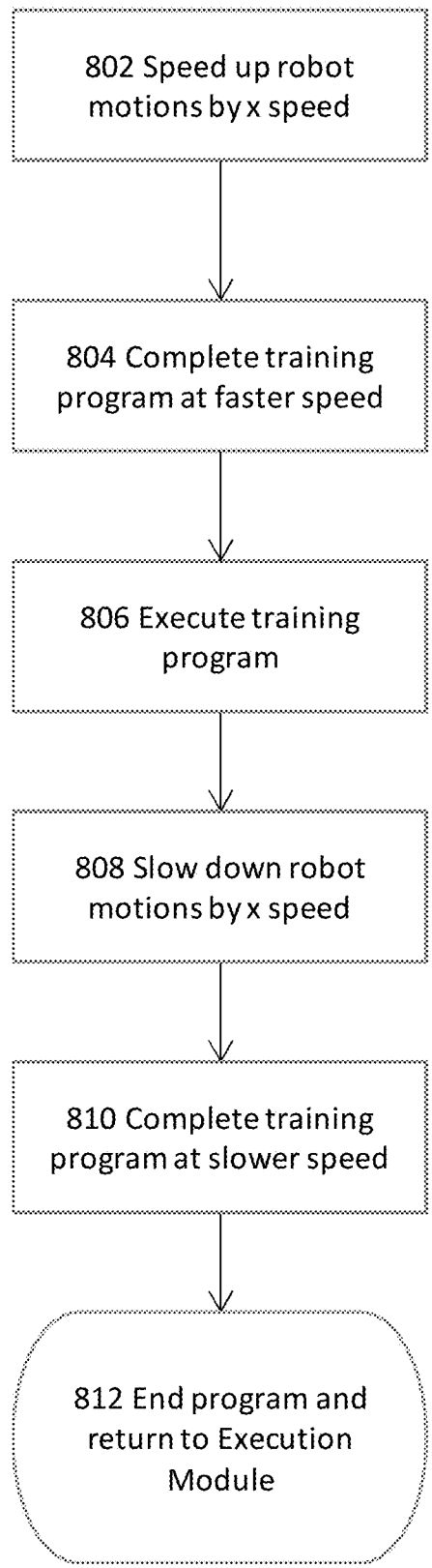
FIG. 8 is a flowchart illustrating an exemplary of speed sensitivity.

FIG. 8 is a flowchart illustrating an exemplary of speed sensitivity. The process begins with the speed sensitivity module 144—which may be initiated by the execution module 142. The speed sensitivity module 144 may start to re-run the training program that the execution module 142 had just run at step 800. In step 802, the speed sensitivity module 144 then speeds up the robotic movements by a factor of "x". For example, the speed sensitivity module 144 may speed up the robotic motion by x=5 which could increase the robotic movements to five times faster than the defined normal speed.

The speed sensitivity module 144 then completes the training program at step 804. The training is then re-run again at step 806. In step 808, the speed sensitivity module 144 then slows down the robotic movements by a factor of "x". For example, the speed sensitivity module 144 may slow down the robotic motion by x=5, which could decrease the speed of the robotic movements to five times slower than the defined normal speed. The speed sensitivity module 144 then completes the training program at step 810. The program ends and returns to the execution module 142 at step 812.

Figure 9:
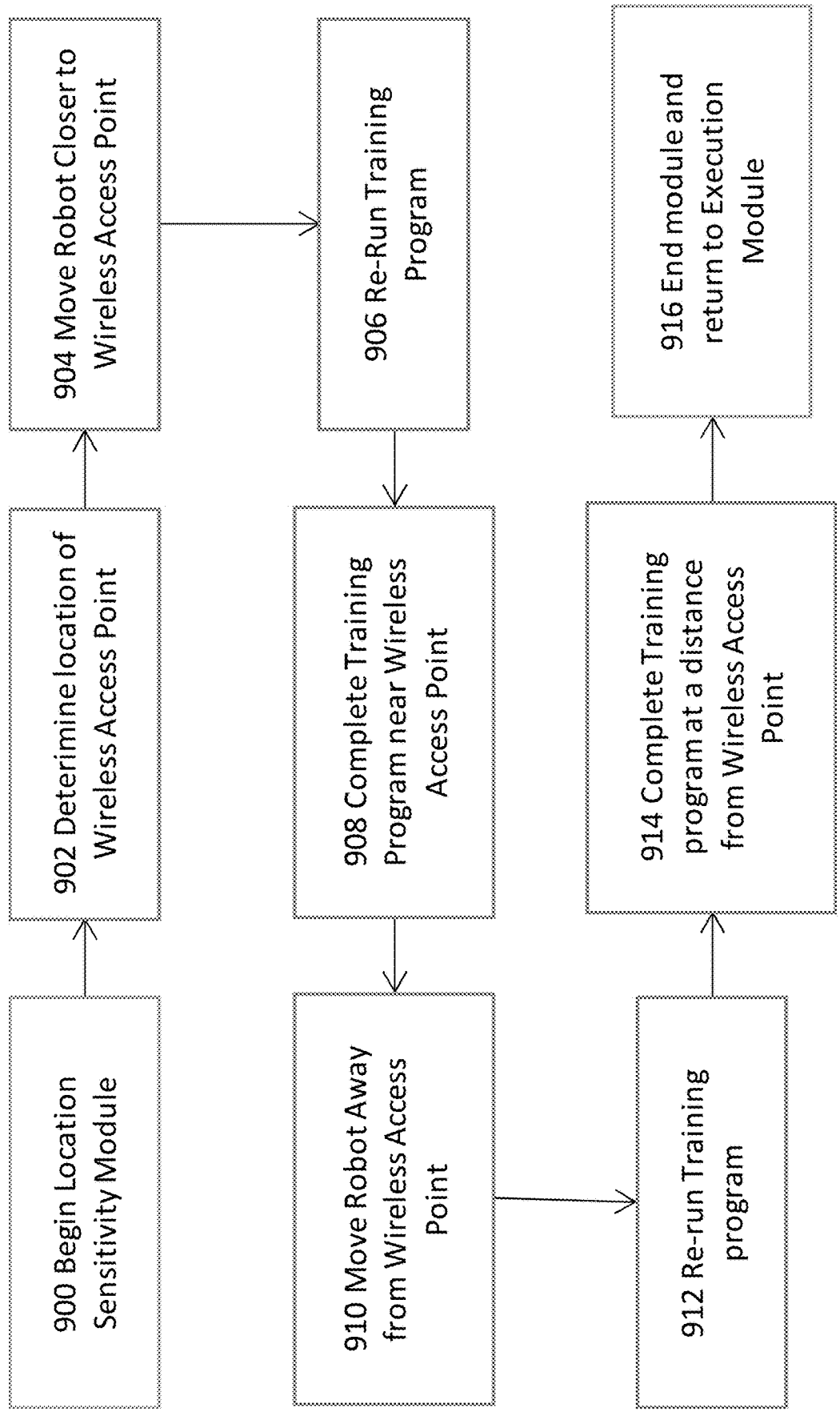
FIG. 9 is a flowchart illustrating an exemplary of location sensitivity.

FIG. 9 is a flowchart illustrating an exemplary of location sensitivity. The process begins with the location sensitivity module 146 being initiated by the execution module 142 at step 900. The location sensitivity module 146 may then determine where the wireless access point 102 is located. One aspect of the location sensitivity module 146 allows the training robot 136 can be moved either closer or further way from the access point 102 at step 902. After determining the direction and/or location of the wireless access point 102 the training robot 136 is moved closer to the access point 102. The location sensitivity module 146 may monitor the signal strength of the wireless access point 102 as an indicator of how close the training robot 136 is to the access point 102 at step 904.

The training program that was initially run by the execution module 142 is now re-run, but with the training robot 136 closer to the wireless access point 102 at step 906. The training program may run and be completed at a location near to the wireless access point 102 at step 908. Once the program is completed, the training robot 136 then moves a distance away from the wireless access point 102. In one embodiment, training robot 136 may continue to move farther away from the wireless access point 102 by monitoring the signal strength at step 910. The training program is then re-run again but this time with the training robot 136 at a distance from the wireless access point 102 at step 912. The training is program is then run and completed at a distance from the wireless access point 102 at step 914. The location sensitivity module 146 then ends and returns to the execution module 142 at step 916.

In an embodiment, an IoT device may be used to improve accuracy of passive Wi-Fi based motion detection systems. An IoT device database of FIG. 10 stores information related to each IoT device connected to the wireless access point 102. That information includes, but not limited to, the location information, the function of the device, and the activity associated with operating the device, all of which is provided either by the IoT device database of FIG. 10 or by a user. The IoT device database of FIG. 10 could also include sensor data feed columns for devices with additional capabilities, such as a virtual assistant, that could provide additional context data to further refine the profile associated with the activity.

The cloud server 120 may monitor that activity of the wireless access point 102 via the agent 114, as well as the activities of the IoT devices connected to the wireless access point 102 in order to trigger the installation module when new IoT devices are connected, and the location modules and activity modules when data events are detected simultaneously in both the activity identification module 118 and an IoT device. An installation module may connect new IoT devices to the system and register in the IoT device database of FIG. 10 information related to the location of the device the function of the device, and the activity associated with the function of the IoT device. These definitions are provided either by the IoT device (e.g., if the IoT device has that level of sensor and computational capabilities) or through definition by a user through a training interface. A location module may compare the location associated with the impulse or frequency response of the channel (e.g., in the profile database 122 identified by the activity identification module 118) to the location associated with the data event from the IoT device. When the two locations do not match, the data provided by the IoT device is sent to the profile module 126 to be used to improve the profile definitions in the profile database 122. An activity module may compare the activity associated with the impulse or frequency response of the channel in the profile database 122 identified by the activity identification module 118, to the activity associated with the data event from the IoT device. When the two activities do not match, the data provided by the IoT device is send to the profile module 126 to be used to improve the profile definitions in the profile database 122. At least one IoT device, or a group of up to n number of IoT devices. Consumer connected devices including smart TVs, smart speakers, toys, wearables and smart appliances, smart meters, commercial security systems and smart city technologies, such as those used to monitor traffic and weather conditions, are examples of industrial and enterprise IoT devices, that could all be incorporated into this system in various embodiments.

FIG. 10 illustrates an exemplary IoT device database. The IoT device database of FIG. 10 contains information related to each IoT device associated with each IoT device 138 connected to the system. That information includes, but not limited to; the location information, the function of the device, and the activity associated with operating the device, all of which is provided either by the IoT device or by a user. The IoT device database of FIG. 10 could also include sensor data feed columns for devices with additional capabilities, such as a virtual assistant, that could provide additional context data to further refine the profile associated with the activity.

Figure 11:
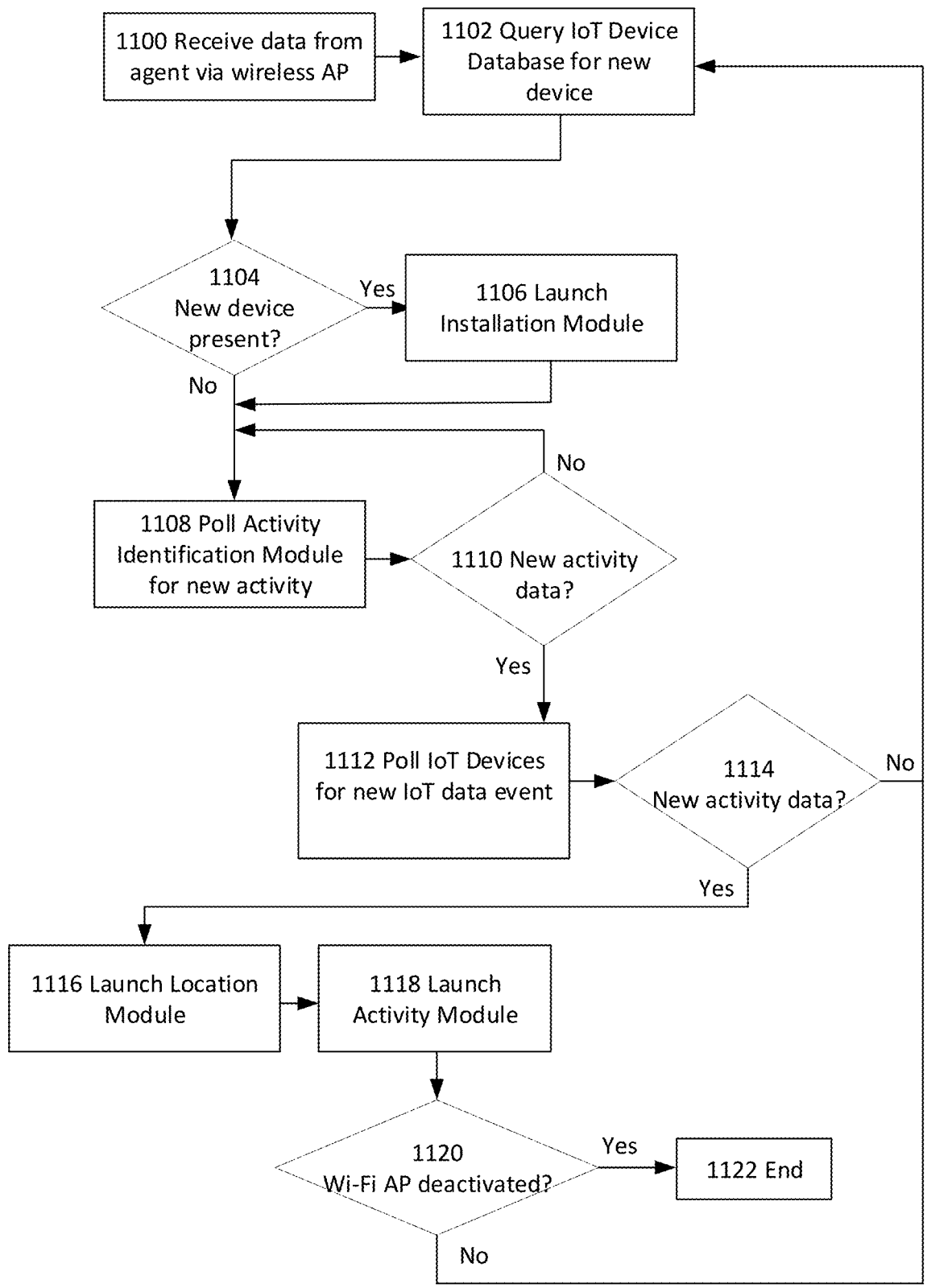
FIG. 11 is a flowchart illustrating an exemplary method of IoT device management for Wi-Fi motion detection.

FIG. 11 is a flowchart illustrating an exemplary method of IoT device management for Wi-Fi motion detection. Such method may be performed by cloud server 120. The process begins with data being received via the agent 114 from the wireless access point 102 at step 1100. The IoT database 128 may be queried for the presence of a new IoT device being added to the home network at step 1102. It may be determined if a new IoT device 138 is present at step 1104. If a new IoT device is detected in the IoT device database of FIG. 10, the installation module may be launched at step 1106.

The activity identification module 118 may be polled for new motion data at step 1108. It may be determined if the activity identification module 118 has identified a motion at step 1110. If there is motion identified, the IoT devices in the IoT device database of FIG. 10 may be polled for new data event(s) at step 1112. It may be determined if there are any IoT device that coincides with the motion data at step 1114. If there is both motion and IoT data, a call to the location module may determine if the location identified by the activity identification module 118 is in agreement with the location data from the IoT device at step 1116.

Once the location module has completed, a call to the activity module may determine if the activity identified by the activity identification module 118 is in agreement with the activity data from the IoT device at step 1118. It may be determined if data is still being received from the wireless access point 102, via the agent 114 at step 1120. If data is still coming in from the agent 114, the method may return to step 1102. If the data is no longer coming from the agent 114, the method may go to step 1122.

Figure 12:
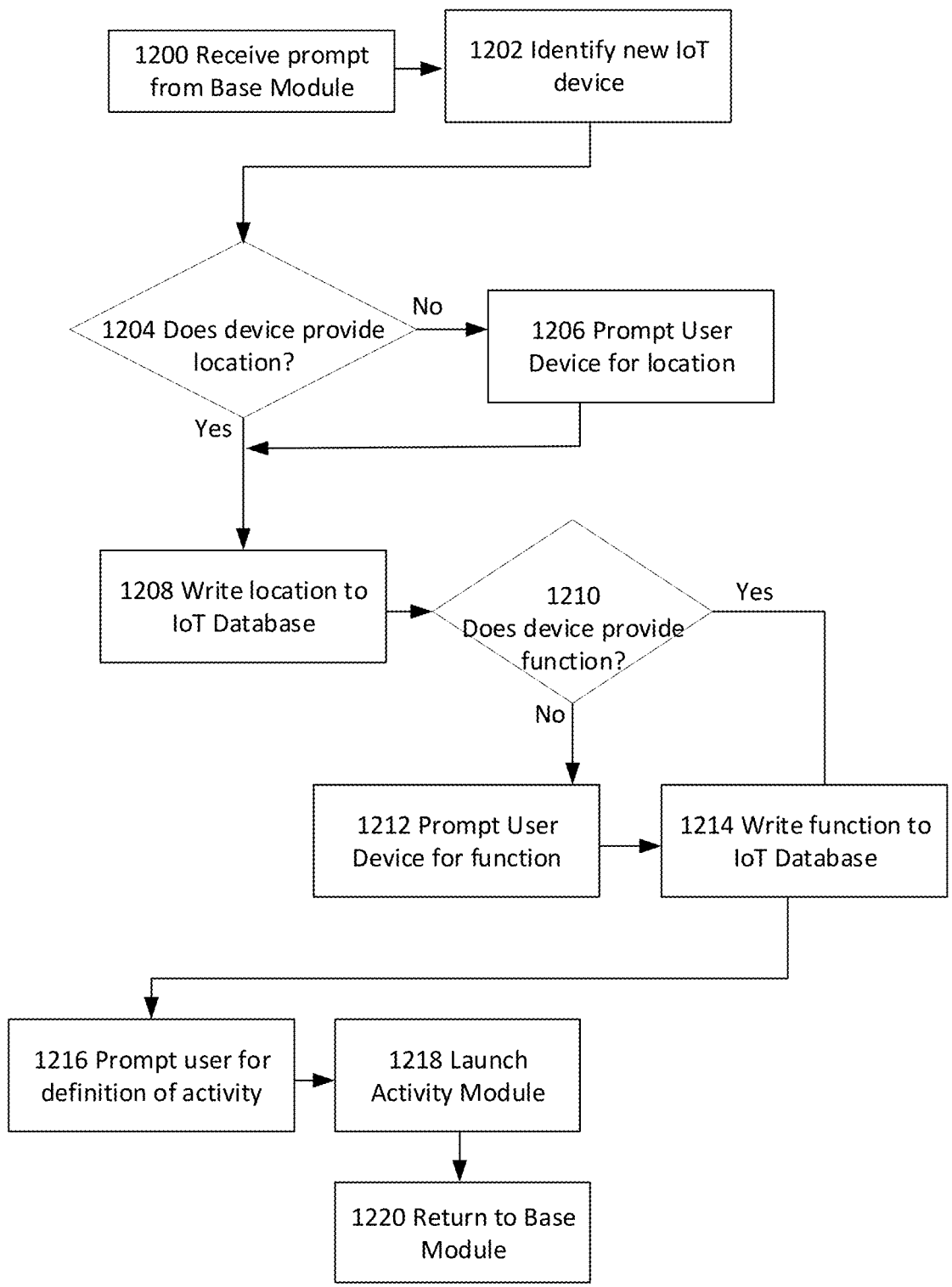
FIG. 12 is a flowchart illustrating an exemplary method of IoT device installation.

FIG. 12 is a flowchart illustrating an exemplary method of IoT device installation. Such method may be performed based on execution of an installation module. The process begins with receipt of a prompt from the cloud server 120 at step 1200. The new IoT device added to the IoT device database of FIG. 10 may be characterized by such parameters as make, model, capabilities, etc., at step 1202. It may be determined if the IoT device provides data about the associated location, and the data provided to the IoT device database of FIG. 10 may be written to the IoT device database of FIG. 10 at step 1204. If the device does not provide data about location, the user device may prompt a user to input the location of the new device (e.g., identifying that a specified light switch is in the bathroom) at step 1206.

The user-provided location of the new device may be written to the IoT device database of FIG. 10 at step 1208. It may be determine if the device provides data about associated function, and write the data provided to the IoT device database of FIG. 10 at step 1210. If the device does not provide data about associated function, the user device may be prompted for input regarding the function of the new device (e.g., identifying that a specified light switch in the bathroom operates the bathroom lights) at step 1212. The user-provided function of the new device may be written to the IoT device database of FIG. 10 at step 1214. A prompt may be provided to obtain user input defining the activity, such as activating the light switch. The process for defining this activity in this embodiment may allow the user to provide a natural language definition of the activity. In alternate embodiments, the user could perform the activity in response to a prompt or query from the system, allowing the activity identification module 118 to take a sample of the impulse or frequency response of the channel to the activity being defined as linked to the IoT device at step 1216. The user-provided activity of the new device may be written to the IoT device database of FIG. 10 at step 1218. The method may return to the cloud server 120 at step 1220.

Figure 13:
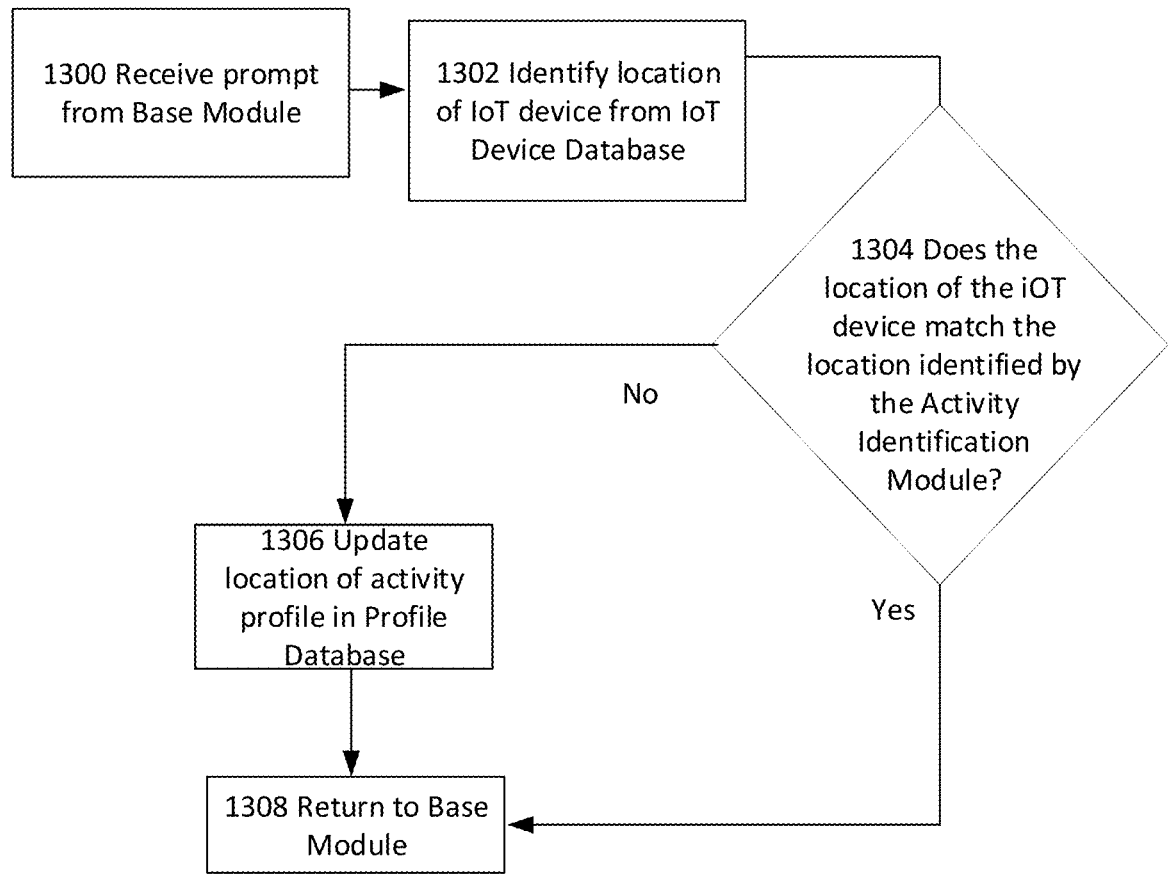
FIG. 13 is a flowchart illustrating an exemplary method of IoT location tracking.

FIG. 13 is a flowchart illustrating an exemplary method of IoT location tracking. The method may be performed based on execution of a location module. The process begins with receiving a prompt from the cloud server 120 that there is IoT data that coincides with motion data from the activity identification module 118 at step 1300. The location of the IoT device from the IoT device database of FIG. 10 may be identified at step 1302.

It may be determine if the location of the IoT device matches the location of the motion identified by the activity identification module 118. If the location matches, the method may return to the cloud server 120 at step 1304. If the location identified by the activity identification module 118 does not match the location of the IoT device, the location of the IoT device is sent to the profile module 126 to update the profile database 122. In the future when the activity identification module 118 sees the current profile in the impulse or frequency response of the channel, activity identification module 118 may recognize such activity as taking place in the location defined by the IoT device at step 1306. The method 600 may further return to the cloud server 120 at step 1308.

Figure 14:
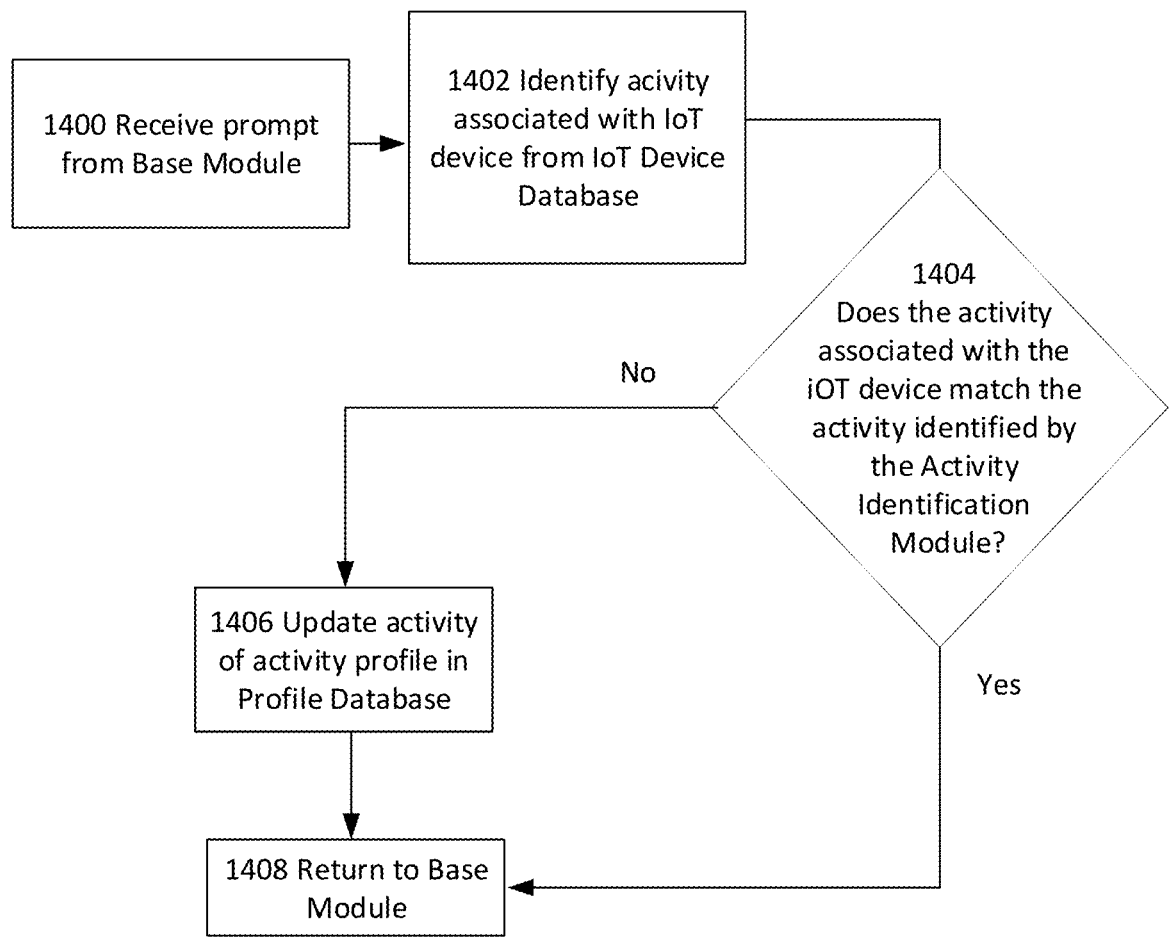
FIG. 14 is a flowchart illustrating an exemplary method of IoT activity tracking.

FIG. 14 is a flowchart illustrating an exemplary method of IoT activity tracking. Such method may be performed based on execution of an activity module. The process begins with receiving a prompt from the cloud server 120 that there is IoT data that coincides with motion data from the activity identification module 118 at step 1400.

The activity associated with the IoT device from the IoT device database of FIG. 10 may be identified at step 1402. It may be determine if the activity associated with the IoT device matches the activity associated the profile of the frequency response of the channel identified by the activity identification module 118. If the activity matches, the method may return to the cloud server 120 at step 1404. If the activity identified by the activity identification module 118 does not match the activity associated with the IoT device, the activity associated with the IoT device is sent to the profile module 126 to update the profile database 122. In the future when the activity identification module 118 sees the current profile in the impulse or frequency response of the channel, activity identification module 118 may recognize such data as corresponding to the activity defined by the IoT device at step 1406. The method may return to the cloud server 120 at step 1408.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for training a motion detection system, the system comprising:
    a wireless access point located within a monitored space, wherein the wireless access point is in communication with an Internet-of-Things (IoT) device;
    an agent device that collects frequency response signal data from the wireless access point regarding the monitored space;
    a cloud server that receives the collected frequency response signal data sent by the agent device over a communication network and identifies that the collected frequency response signal data is indicative of one or more human activities within the monitored space, wherein a frequency response from the IoT device is associated with a location stored in a profile database and indicates a type of activity occurring at the location; and
    a robot that receives a command corresponding to one of the indicated human activities from the cloud server and executes the received command to perform an action mimicking the corresponding human activity.

2. The system of claim 1, further comprising the profile database that stores a plurality of sets of frequency response data each corresponding to different human activities, wherein the cloud server identifies the indicated human activities based on matching the collected frequency response data to one or more of the sets of frequency response data.

3. The system of claim 2, wherein the action includes one or more training actions mimicking a human movement, and wherein the command is associated with a training program executable by the robot to:
    move to a location at a specified distance from the wireless access point; and
    execute the command to perform the one or more training actions mimicking the human movement, wherein the cloud server further:
        monitors a set of frequency response signal data associated with the training actions based on radio signal strength of the wireless access point;
        compares the set of frequency response signal data associated with the training actions to stored sets; and
        updates the profile database with the set of frequency response signal data associated with the training actions.

4. The system of claim 1, further comprising a speed sensitivity module executable to:
    send signals to the robot indicating one or more varied speeds of the robot; and
    measure a speed sensitivity of the robot by:
        monitoring the collected frequency response signal data at each of the varied speeds of the robot, and
        storing the monitored frequency in a training database in association with the respective varied speed.

5. The system of claim 1, further comprising a location sensitivity module executable to:
    send signals to the robot indicating one or more varied distances of the robot from the wireless access point; and
    measure a location sensitivity of the robot by:
        tracking frequency response signal data at each of the varied distances of the robot, and
        storing the monitored frequency in a training database in association with the respective varied location.

6. The system of claim 1, further comprising a correction module executable to add a new profile in the profile database when the collected frequency response signal data does not match any previous activity.

7. The system of claim 1, further comprising a variation module executable to repeat a training program and identify anomalous data associated with the repeated training program in comparison to past activities stored in a training database.

8. The system of claim 7, wherein the variation module is further executable to remove the anomalous data from the training database.

9. A method for training a motion detection system, the method comprising:
    receiving collected frequency response signal data sent over a communication network from an agent device in communication with a wireless access point that is in communication with an Internet-of-Things (IoT) device, the frequency response signal data collected by the wireless access point regarding a monitored space;
    identifying that the collected frequency response signal data is indicative of one or more human activities within the monitored space, wherein a frequency response from the IoT device is associated with a location stored in a profile database and indicates a type of activity occurring at the location; and
    transmitting a command to a robot, the command corresponding to one of the indicated human activities, wherein the robot executes the received command to perform an action mimicking the corresponding human activity.

10. The method of claim 9, further comprising storing a plurality of sets of frequency response data in the profile database, each set corresponding to different human activities, and identifying the indicated human activities based on matching the collected frequency response data to one or more of the sets of frequency response data.

11. The method of claim 10, wherein the action includes one or more training actions mimicking a human movement, and wherein the command is associated with training program, wherein execution of the training program comprises:
    commanding the robot to move to a location at a specified distance from the wireless access point and to perform the one or more training actions mimicking the human movement;
    monitoring a set of frequency response signal data associated with the training actions based on radio signal strength of the wireless access point;
    comparing the set of frequency response signal data associated with the training actions to stored sets; and
    updating the profile database with the set of frequency response signal data associated with the training actions.

12. The method of claim 9, further comprising executing a speed sensitivity module, wherein execution of the speed sensitivity module comprises:
    sending signals to the robot indicating one or more varied speeds of the robot; and
    measuring a speed sensitivity of the robot by:
        monitoring the collected frequency response signal data at each of the varied speeds of the robot, and
        storing the monitored frequency in the training database in association with the respective varied speed.

13. The method of claim 9, further comprising executing a location sensitivity module, wherein execution of the location sensitivity comprises:
    sending signals to the robot indicating one or more varied distances of the robot from the wireless access point; and
    measuring a location sensitivity of the robot by:
        tracking frequency response signal data at each of the varied distances of the robot, and
        storing the monitored frequency in a training database in association with the respective varied location.

14. The method of claim 9, further comprising executing a correction module, wherein execution of the correction module comprises adding a new profile in the profile database when the collected frequency response signal data does not match any previous activity.

15. The method of claim 9, further comprising executing a variation module, wherein execution of the variation module comprises repeating a training program and identifying anomalous data associated with the repeated training program in comparison to past activities stored in a training database.

16. The method of claim 15, wherein execution of the variation module further comprises removing the anomalous data from the training database.

17. A non-transitory, computer-readable storage medium, having embodied thereon a program executable by a processor to perform a method for training a motion detection system, the method comprising:
    receiving collected frequency response signal data sent over a communication network from an agent device in communication with a wireless access point that is in communication with an Internet-of-Things (IoT) device, the frequency response signal data collected by the wireless access point regarding a monitored space;

identifying that the collected frequency response signal data is indicative of one or more human activities within the monitored space, wherein a frequency response from the IoT device is associated with a location stored in a profile database and indicates a type of activity occurring at the location; and transmitting a command to a robot, the command corresponding to one of the indicated human activities, wherein the robot executes the received command to perform an action mimicking the corresponding human activity.

* * * * *